United States Patent [19]
Kwast et al.

[11] 3,718,860
[45] Feb. 27, 1973

[54] REAL TIME DIGITAL ENERGY METER

[75] Inventors: Victor B. Kwast, Union; Douglas A. Morlock, Lake Hopatcong; Richard G. Saiz, Succasunna, all of N.J.

[73] Assignee: The United States of America as represented by the Secretary of the Army

[22] Filed: Aug. 25, 1971

[21] Appl. No.: 174,834

[52] U.S. Cl. .................................................324/142
[51] Int. Cl. ...........................................G01r 21/00
[58] Field of Search ..............................324/142, 99 D

[56] References Cited

FOREIGN PATENTS OR APPLICATIONS 1,951,437  10/1970  Germany..............................324/142

OTHER PUBLICATIONS

Bombi, et al., IEEE Trans. Inst. & Meas., v–19 No. 1, Feb. 1970, pp. 57–61.

*Primary Examiner*—Alfred E. Smith
*Attorney*—Harry M. Saragovitz et al.

[57] ABSTRACT

A real-time digital energy meter particularly suited for measuring electrical energy in a non-linear load, comprising: voltage sensing means, said means connected across said load; current sensing means, said current sensing means connected into said load for current measurement and said current sensing means having a voltage output proportional to its current input; electronic multiplication means having two inputs, the two inputs being the respective outputs of said voltage and current sensing means, wherein said multiplication means produces a voltage output proportional to the product of its two inputs; and a time-integrating digital voltmeter having as its input the output of said multiplication means, and having a selectable period of time integration wherein the output of said integrating voltmeter is proportional to the energy dissipated within said load during said period of integration.

4 Claims, 1 Drawing Figure

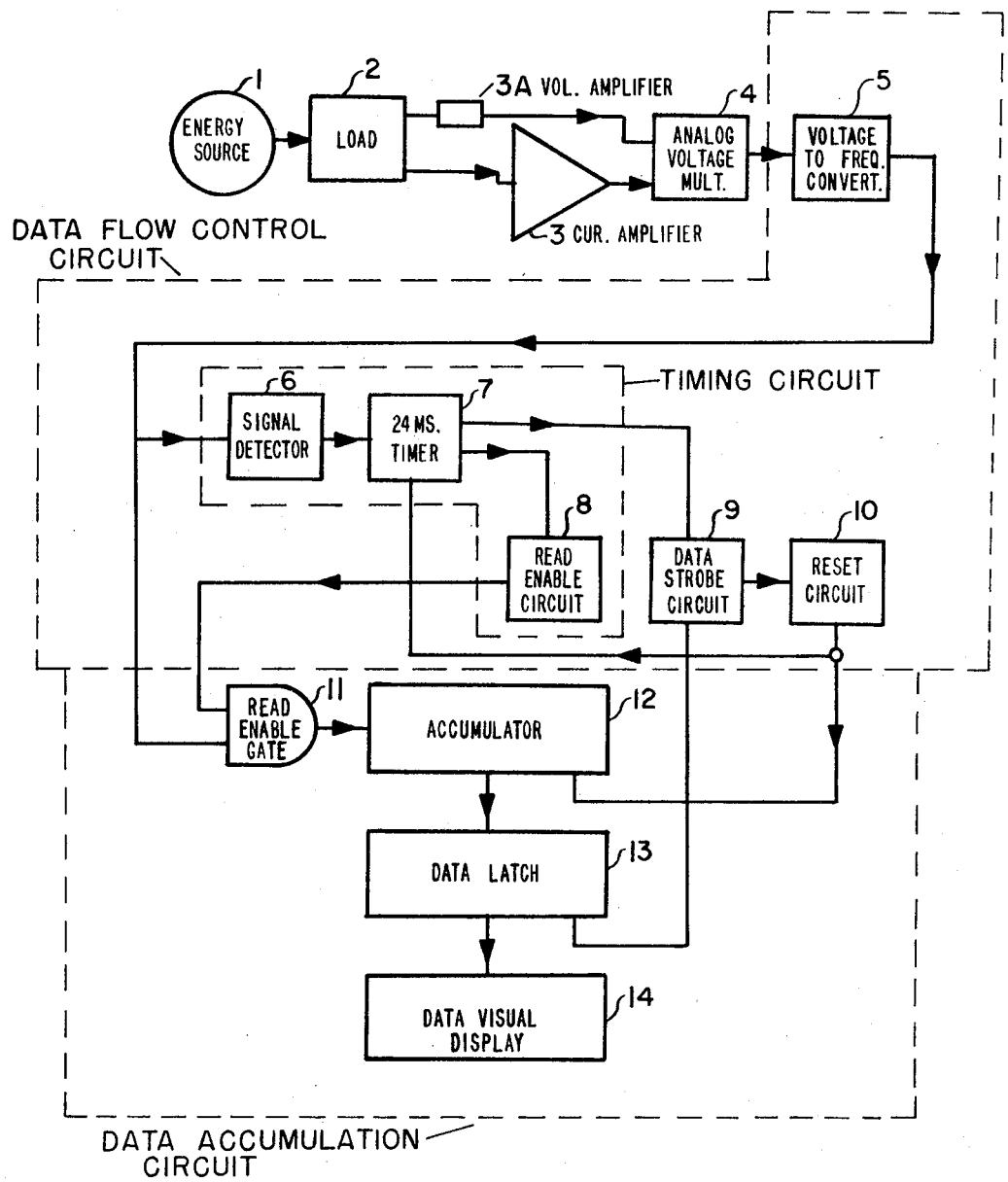

REAL TIME DIGITAL ENERGY METER

The invention described herein may be manufactured, used and licensed by or for the Government of the United States for governmental purposes without the payment to us of any royalty thereon.

BACKGROUND OF THE INVENTION

The present invention relates to that field of art dealing with the measurement of electrical energy. More specifically, the invention affords a novel mode of measuring the passage of pulse-form electrical energy through a non-linear load. The requirement for a digital energy meter grew out of the military's need to accurately determine (1) the energy output of a small hand-activated generator and (2) the energy required to initiate a firing squib connected to such a generator. A firing squib can be used to detonate a variety of munitions, including Claymore and anti-personnel mines. It was with such mines that the basic R&D on the instant invention was done.

Measurement of energy is normally a straightforward process of measuring current (I) and resistance (R); calculating power, I²R; and then taking a unit time summation of the power, thus arriving at the energy for that time period. A difficulty in such measurement arises when a variable resistance or load is encountered. Since I and V are usually both variable under such conditions, energy can only be calculated in terms of both instantaneous voltage and current over the desired time unit T, that is, $$K \int_0^T i(t)v(t)dt$$

where $K$ is a conversion constant. Present methods of making this calculation require a time consuming, laborious process of manually integrating photographic prints obtained from an oscilloscope. It is precisely this calculation which the present invention simulates by digital processes with an accuracy not realizable with any known prior art device.

In designing a hand-activated generator of the type used for munitions purposes, it is necessary to know the level of the energy demand which will be made on the generator. Since the load on the generator will be steadily increasing in temperature, its resistance will also be rising, up until the instant of initiation. Hence, the real-time energy required to initiate a load or squib can be accurately determined only with the use of the present digital energy meter.

Equipped with the knowledge of what a squib's energy demand is, a generator designed for maximum economy of size and weight can be built.

SUMMARY OF THE INVENTION

An object of the present digital energy meter (DEM) is to provide an instrument for real-time measure of electrical energy.

Another object is to provide an instrument for measuring electrical energy in a non-linear load.

A further object is to provide an instrument for measuring electrical energy in pulse form in a non-linear load.

A yet further object is to provide a DEM than can effect the above objects at both a lower cost and a greater accuracy than has heretofore been possible.

Another object is to provide an energy measuring device that will improve the design characteristics of electrically initiated detonators.

The present invention comprises: A real-time digital energy meter particularly suited for measuring electrical energy in a non-linear load, comprising: voltage sensing means, said means connected across said load; current sensing means, said current sensing means connected into said load for current measurement and said current sensing means having a voltage output proportional to its current input; electronic multiplication means having two inputs, the two inputs being the respective outputs of said voltage and current sensing means, wherein said multiplication means produces a voltage output proportional to the product of its two inputs; and a time-integrating digital voltmeter having as its input the output of said multiplication means, and having a selectable period of time integration, wherein the output of said integrating voltmeter is proportional to the energy dissipated within said load during said period of integration.

THE DRAWING

The drawing illustrates, in block diagram form, the present real-time digital energy meter.

DESCRIPTION OF THE PRESENT EMBODIMENTS

The digital energy meter (DEM), in order to measure energy through a non-linear load, must determine both the voltage across such a load and the current through it, and then sense the product of these quantities over the time period of interest.

Referring to the drawing, there is indicated an energy source 1 which, in the case of a hand-activated generator, emits a pulse of energy. This energy pulse is then delivered to a load 2 which may be a fixed resistance, a squib, or any other detonating means. The voltage across, and the current through the load are sensed at elements 3 and 3A. The current signal passes through the current amplifier 3 which transforms the signal into a proportional voltage to be fed along with the voltage signal into the inputs of an analog voltage multiplier 4. The output of 4 is a voltage equal to the instantaneous product of the voltages at its input.

This voltage is then fed into a network which is basically an integrating digital voltmeter. This integrating voltmeter comprises two subsystems, a data flow control circuit and a data accumulation circuit. See drawing. The data flow circuit is comprised of six components, the functions of which are described below. These six are a voltage to frequency converter 5, a signal detector 6, a timing circuit, a read enable circuit 8, a data strobe circuit 9 and a reset circuit 10. The timing circuit comprises a signal detector 6, a means for generating timing pulses, such as a 24 millisecond and a timer 7, and a read enable circuit 8.

The data accumulation circuit comprises four components, the functions of which are also described below. These four are a read enable gate 11, an accumulator 12, a data latch 13 and a visual data display circuit 14.

Again illustrating the operation of the DEM, the drawing shows the output of the analog multiplier 4 transferred to the input of the voltage to frequency converter 5. This converter generates a series of pulses, the repetition rate of which is directly proportional to the magnitude of the voltage at its input. Or, in other words, the total number of pulses emitting from 5 for a fixed time interval is directly proportional to the integral of the voltage appearing at its input for that time interval. Furthermore, since the voltage at the converter's input is directly proportional to the voltage multiplied by the current, the total number of pulses from element 5 during a given time frame is directly proportional to the energy delivered by the energy source 1 to the load 2 during the given time frame.

The output of the voltage to frequency converter is fed into the signal detector 6 and the read enable gate 11.

The signal detector 6 starts the 24 millisecond timer 7. Any time frame suitable to the application at hand may be used.

The timer 7 sends its 24 millisecond "window" through the read enable circuit 8 and then into the read enable gate 11. The effect of this "window" is to shut the gate 11 off after 24 milliseconds, hence halting the flow of pulses from the converter 5. During the 24 millisecond period, pulses passing through gate 11 are stored in an accumulator 12.

Immediately after gate 11 has been closed by the timing circuit, the data strobe circuit 9, enables the data collected in the accumulator 12 to be transferred to the data latch 13 which will hold the data on the visual display 14.

Immediately after the 24 millisecond data strobe pulse, a reset circuit 10 is activated, thereby resetting the timer circuit 7 and the accumulator 12.

With all of the gain adjustments in the circuit set properly, the number of pulses summed in the accumulator 12 and subsequently displayed on the data visual display 14 is equal to the energy in milliwatt-seconds dissipated in the load 2 during the 24 millisecond measurement interval. The visual readout may then be fed to a printer output.

The entire logic section of the DEM, with the exception of the accumulator-readout interface, may be made of integrated diode-transistor logic (DTL). Transistor-transistor logic (TTL) quad latches may be used, to enable the instrument to have a storage capability with minimum can count. The front end of the DEM, performing the functions of voltage and current measurement, signal multiplication, and voltage to frequency conversion, may be made of both linear and DTL integrated circuits.

A representative DEM has been constructed and successfully operated with the following design criteria:

| | |
|---|---|
| Voltage input | ±5 volts |
| Current input | ±2 amperes |
| Load Resistance | 1 –50 ohms |
| Time Gate | 24±0.1 milliseconds |
| Response Time | 10 microseconds |
| Energy Range | 1 – 100 milli-watt-seconds |
| Accuracy | ±1% F. S. max. |
| Display | 5 digit visual |
| Self Test | panel mounted pushbutton |

The following hardware was used in constructing the DEM:

| Component | Model No. (all items are Motorola unless otherwise indicated) |
|---|---|
| Current Sensing Means 3 | MC1437L |
| Analog Multiplier 4 | Intronics Multiplier m409 |
| Voltage to Frequency Converter 5 | MC 181P; MC1437L; MC1414L |
| Signal Dector 6 | MC1414L |
| 24 Millisecond Timer 7 | 83MC838P; 83M839P (two) |
| Read Enable Circuit 8 | MC7475P (Five) -tb Data Strobe |
| Data Strobe Circuit 9 | MC851P; MC844P |
| Reset Circuit 10 | MC851P; Mc849P |
| Read Enable Gate 11 | MC846P |
| Accumulator 12 | MC838P (Five) |
| Data Latch 13 | MC 7475P |
| Data Visual Display 14 | Burroughs BIP8910-1(Five) |

It should be noted that the DEM is suitable to a variety of real-time energy measurements. For example, by measuring the energy passing through a variety of different resistive loads, each connected across the output of a generator, the resistance capable of receiving the generator's maximum energy output can be determined. With suitable circuit additions and modifications, the DEM can be a universal real-time energy measuring device. Measurement intervals can be selected with an accuracy of 1 microsecond. Also, with proper rectification, measurement of any waveform, both periodic and aperiodic, and having any frequency from DC to 10KHz, would present no problem. Also, other displays can easily be added to the present device. These displays can illustrate the (1) time interval of energy transfer, (2) peak current, (3) voltage at peak current, and (4) time, from zero, of peak current.

It should be further noted that the DEM provides an accuracy of one per cent whereas prior art techniques of measuring energy through a nonlinear load provided accuracies of no better than 10 per cent.

As regards economic considerations, the cost savings of the DEM lies in retrieving those test items that would have been rejected under present test methods. Furthermore, the DEM will insure that items deserving of rejection are in fact rejected.

It is thus seen from the above that the objects set forth are among those made apparent from and efficiently attained by, the device of the preceding description.

We wish it to be understood that we do not desire to be limited to the exact detail of construction shown and described for obvious modification will occur to persons skilled in the art.

Having described our invention, what we claim as new, useful and non-obvious and accordingly secure by Letters Patent of the United States is:

1. A real-time digital energy meter particularly suited to measuring energy in a non-linear load, comprising:
   instantaneous power sensing means connected across and into said load which includes;
   voltage sensing means;
   current sensing means having a voltage output proportional to its current input;
   electronic multiplication means having two inputs connected to outputs of said voltage and current sensing means, wherein said multiplication means produces a voltage output proportional to the product of its two inputs;
   an integrating digital voltmeter having as its input the output of said power sensing means, and having a selectable period of time integration which includes;
   a data flow control circuit having
   a voltage to frequency converter having as its input the output of said multiplication means, wherein said converter generates a number of pulses per time interval directly proportional to the time integral of the voltage appearing at said converter's input, and said converter also having two outputs, one of which constitutes a first of two inputs to said data accumulation circuit; and timing means, said means having as its input the second of the two outputs of said converter, whereby said timing means limits the duration of the input to said data accumulation circuit; and a data accumulation circuit connected to the output of said data flow control circuit having a data display circuit;

wherein the output of said integrating voltmeter is proportional to the energy dissipated within said load during said period of integration.

2. A digital energy meter as recited in claim 1, in which said timing means comprises:

a signal detector having as its input the output of said voltage to frequency converter;

means for generating timing pulses having a time-width interval corresponding to the energy-measurement time period of interest, said time-pulse generating means having two inputs, one of which is the output of said signal detector and said time-pulse generating means further having two putputs;

a read enable circuit having as its input one of the outputs of said time-pulse generating means, and having its output connected as to constitute the second input to said data accumulation circuit, wherein said read enable circuit limits the time of operation of said data accumulation circuit to the energy-measurement time period of interest.

3. A digital energy meter as recited in claim 2, in which said data accumulation circuit comprises:

a read enable gate having two inputs in which one of the two inputs constitutes the output of said voltage to frequency converter and the other of the two inputs consitutes the output of said read enable circuit;

a data accumulator having as one of its two inputs the output of said read enable gate, wherein said data accumulator stores the data pulses received from said enable gate; and a data latch having as one of its two inputs the output of said data accumulator, wherein said data latch will, upon command from said circuit, transfer the data appearing on its input to its output, wherein said output is attached to the input of said data display circuit.

4. A digital energy meter as recited in claim 3 in which said timing means further comprises:

a data strobe circuit having as its input one of the outputs of said time-pulse generating means, and having two outputs in which one of its two outputs constitute one of the inputs to said data latch, wherein said strobe circuit periodically commands said data latch to transfer the information on its input to the display circuit at its output; and a reset circuit having as its input one of the two outputs of said data strobe circuit, and having two outputs, one constituting an input to said time-pulse generating means and the other constituting an input to said data accumulator, wherein said reset circuit will reset the digital energy meter for another measurement after the elapse of a predetermined time period.

* * * * *